US007948334B2

(12) United States Patent
Jones et al.

(10) Patent No.: US 7,948,334 B2
(45) Date of Patent: May 24, 2011

(54) ATTACHMENT OF DEEP DRAWN RESONATOR SHELL

(75) Inventors: Adam J. Jones, Windham, ME (US); Samuel Parent, Guilford, CT (US)

(73) Assignee: Radio Frequency Systems, Inc., Meridan, CT (US)

( * ) Notice: Subject to any disclaimer, the term of this patent is extended or adjusted under 35 U.S.C. 154(b) by 366 days.

(21) Appl. No.: 12/223,374

(22) PCT Filed: Jun. 7, 2006

(86) PCT No.: PCT/US2006/022382

§ 371 (c)(1), (2), (4) Date: Jul. 29, 2008

(87) PCT Pub. No.: WO2007/078325

PCT Pub. Date: Jul. 12, 2007

(65) Prior Publication Data

US 2009/0058566 A1 Mar. 5, 2009

Related U.S. Application Data

(60) Provisional application No. 60/753,558, filed on Dec. 23, 2005.

(51) Int. Cl.
*H01P 7/06* (2006.01)
*F16B 37/14* (2006.01)

(52) U.S. Cl. ........................................ 333/227; 411/431

(58) Field of Classification Search .................. 333/185, 333/208–212, 227–235; 411/429, 431, 372.5, 411/372.7, 373
See application file for complete search history.

(56) References Cited

U.S. PATENT DOCUMENTS

| | | | | |
|---|---|---|---|---|
| 2,896,136 | A | 4/1958 | Hales | |
| 4,107,633 | A | 8/1978 | Scaletta | |
| 5,364,213 | A * | 11/1994 | Teramura | 411/431 |
| 6,064,286 | A | 5/2000 | Ziegner et al. | |
| 6,114,928 | A * | 9/2000 | Smith | 333/202 |
| 6,806,561 | B2 | 10/2004 | Kondoh | |

FOREIGN PATENT DOCUMENTS

| | | | |
|---|---|---|---|
| BE | 542967 | A | 9/1959 |
| CA | 487952 | A | 11/1952 |

* cited by examiner

*Primary Examiner* — Benny Lee
*Assistant Examiner* — Gerald Stevens
(74) *Attorney, Agent, or Firm* — Kramer & Amado, P.C.

(57) ABSTRACT

An apparatus includes a shell member having an interior width, where the shell includes a closed end and an open end, and a nut that includes a plurality of laterally extending resilient leg. The legs define an outer width of the nut, and when the legs are in a relaxed state the outer width of the nut is greater than the interior width of the shell. The nut is adapted for at least partially entering the open end of the shell member, such that the legs are placed in a tensioned state in which the legs define the outer width to be smaller than or equal to the interior width of the shell. The apparatus also includes a base plate adapted for receiving the shell member and securing the shell member to the base plate with the closed end of the shell facing away from the base plate through cooperation with the nut when the nut is at least partially within the shell member.

20 Claims, 5 Drawing Sheets

ATTACHMENT OF DEEP DRAWN RESONATOR SHELL

CROSS-REFERENCE TO RELATED APPLICATIONS

This application claims priority to a U.S. Provisional Patent Application, Ser. No. 60/753,558, filed Dec. 23, 2005, and entitled, "Method of Attaching Inverted Deep Drawn Resonator Shell," which is incorporated herein by reference for all purposes.

TECHNICAL FIELD

This description relates to resonant cavities and, in particular, to inverted deep drawn resonator shells.

BACKGROUND

Resonant cavities can be used as spectral filters of electromagnetic waves (e.g., radio frequency and microwave frequency signals). For example, different communication channels in a telecommunications system can have different channel frequencies, so that signals on the different channels do not interfere. Typically, each channel of a transmitter or a receiver in the telecommunications system includes a narrow bandpass filter to select the frequency of the signal to the channel frequency.

The bandpass filter can include a resonant cavity, the spectral response of which is determined by the dimensions and the electromagnetic properties of the cavity. The resonant cavity can include resonators having any shape. The positions, size, and shapes of resonators within a resonant cavity are selected to tune the spectral response of the cavity to a desired response. The accuracy to which the dimensions of the resonators are manufactured, the shape, the surface finish, surface conductivity and the accuracy with which the resonators are located in the cavity are important factors in determining the spectral response of the cavity. Often cylindrically-shaped resonators are used in a resonant cavity because a cylindrical shape is useful for handing high concentrations of electromagnetic power within the cavity without arching. Good electrical contact between a resonator and the walls of the cavity ensures that the cavity operates as designed.

SUMMARY

In a general aspect, an apparatus includes a shell member having an interior width, where the shell includes a closed end and an open end, and a nut that includes a plurality of laterally extending resilient leg. The legs define an outer width of the nut, and when the legs are in a relaxed state the outer width of the nut is greater than the interior width of the shell. The nut is adapted for at least partially entering the open end of the shell member, such that the legs are placed in a tensioned state in which the legs define the outer width to be smaller than or equal to the interior width of the shell. The apparatus also includes a base plate adapted for receiving the shell member and securing the shell member to the base plate with the closed end of the shell facing away from the base plate through cooperation with the nut when the nut is at least partially within the shell member.

Implementations may include one or more of the following features. For example, the base plate can include a countersunk portion that is adapted to receive the shell member. The base plate can include a shaft adapted for securing the shell member to the base plate through cooperation with the nut, where the shaft is adapted to pass at least partially through the nut. The base plate can include a boring, and the apparatus can further include a shaft adapted for securing the shell member to the base plate through cooperation with the nut, where the shaft is adapted to pass at least partially through the boring and at least partially through the nut. The shaft can include a head having a width greater than a width of a central portion of the shaft, where the width of the head is greater than the width of the boring of the base plate. The shaft can include an outer threaded portion that is adapted for engaging with an inner threaded portion of the boring. The shaft can include a bolt adapted to be threaded through threads of the nut. The outer width of the nut when positioned within the shell member can be greater than a width of the boring.

The shell member can include an interior flange defining a flange opening having a width that is less than the interior width of the shell member, and the nut can be adapted to be passed at least partially through the open end and the flange opening, such that the laterally extending resilient legs of the nut pass at least partially past the interior flange and then extend to define an outer width of the nut that is greater than the flange opening width. The base plate includes a boring, and the apparatus can further include a shaft adapted for securing the shell member to the base plate, where the shaft includes a head having a width greater than a width of a central portion of the shaft, and where the shaft is adapted to pass at least partially through the boring, and at least partially through the nut, and where the width of the head is greater than the width of the boring of the base plate. The shaft can include a bolt adapted to be threaded through threads of the nut. The shell member can include an interior wall having a depression, where the nut is adapted to be passed at least partially through the second open end, such that least at a portion of at least one of the laterally extending resilient legs extends into the depression.

The shell member can include a resonator shell, and the shell member can be a deep drawn resonator shell. The nut can include an at least partially threaded inner hub. The nut can include at least three laterally extending resilient legs. The shell member can include an inward protrusion, where an inner width of the shell member at the inward protrusion is less than the interior width of the shell member, and where the inner width of the shell member at the inward protrusion is adapted to inhibit the entry of the nut into the shell member.

In another general aspect, a method of securing a resonator shell, which includes an open end and a closed end, to a base plate includes inserting into the open end of the shell a nut that includes extending legs that, in a relaxed position, define an relaxed outer width of the nut that is greater than an interior width of the shell. The legs are allowed to extend within an interior of the shell to define a tensioned outer width of the nut that is greater than an opening width of the open end of the shell. A fastener is secured to the nut, and the shell is drawn securely against the base plate with the fastener secured to the nut.

Implementations can include threading the fastener into threads of the nut, and the shell can be a deep drawn resonator shell.

DETAILED DESCRIPTION

Figure 1:
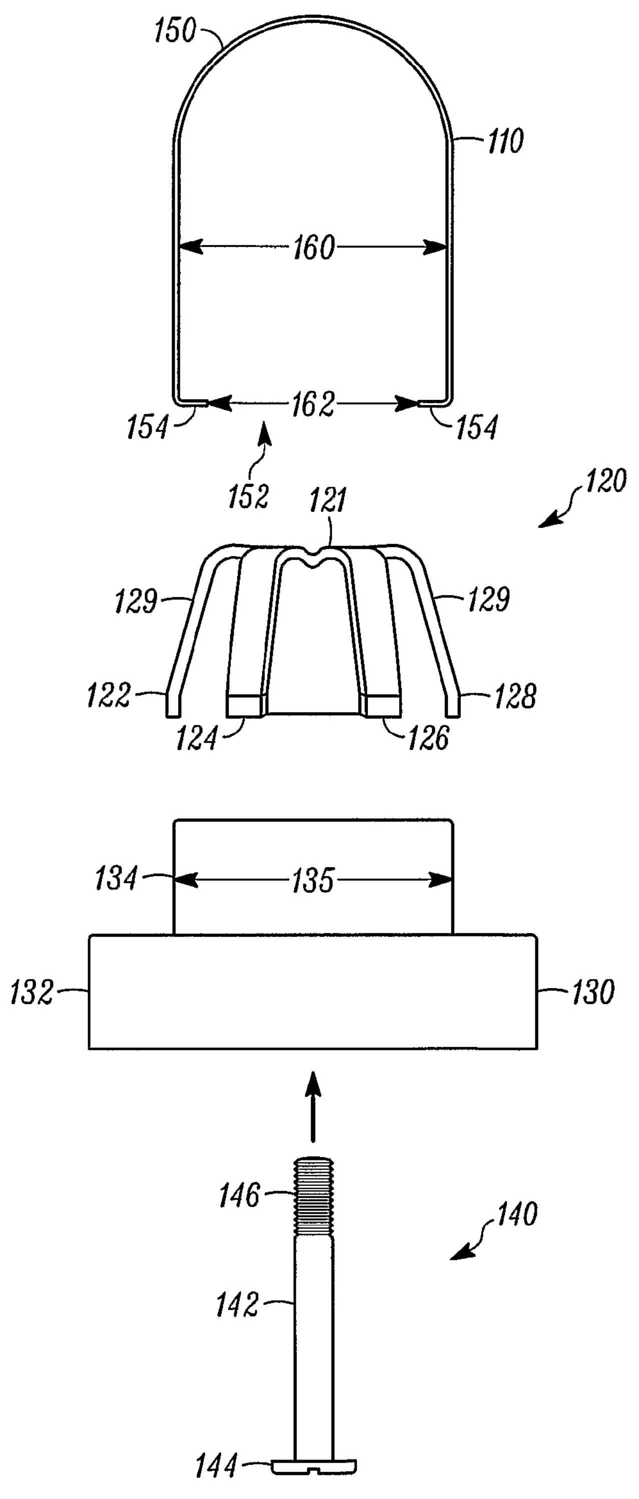
FIG. 1 is a schematic exploded view of a resonator shell and associated components for attaching the shell to a base plate.

FIG. 1 is a schematic exploded view of a resonator shell 110 and associated components for attaching the shell to a base plate 130 of a resonant cavity. The base plate 130 and the resonator shell 100 are both made of electrically conductive materials, e.g., a metal. The material from which the shell 110 and/or the base plate 130 are made can be a material having a low or negative coefficient or thermal expansion, for example, Kovar or Invar, such that the dimensions of the resonant cavity and the resonator change relatively little with changes in temperature. Furthermore, surfaces of the shell 110 and/or the base plate 130 can be coated with a highly conductive material, for example, silver or gold, such that an electromagnetic wave traveling through the resonant cavity suffers relatively little attenuation.

The resonator shell 110 can be fabricated through a deep-drawing process in which a metal blank is placed in a die and struck with a tool, and with each strike of the tool more material of the blank is pushed into the die, such that the blank is eventually formed in a shape determined by the die. The deep-drawing process allows many resonator shells 110 having highly-repeatable and precise dimensions to be created for use in different resonant cavities.

In one implementation, the shell 110 can have can have a generally tubular shape, with a closed end 150 (e.g., shaped somewhat like a hemisphere) and an open end 152. The open end 152 of the shell can include a flange 154 that defines an opening width 162 of the shell that is smaller that an interior width 160 (e.g., an inner diameter for a cylindrical shell) of the shell. The flange 154 can be perpendicular to the side walls of the shell 110 or can be angled with respect to the perpendicular direction. For example, the flange may be angled to point into the interior of the shell 110.

The resonator shell 110 can be fastened to the base plate 130 with a nut 120 that fits inside the shell 110 and is adapted for receiving a fastener 140 (e.g., a bolt or a screw) that engages with the nut and pulls the nut 120 and the shell 110 toward the base plate 130 and into snug contact with the base plate. The nut 120 may be made of a resilient material (e.g., steel) and may include a plurality of extending legs 122, 124, 126, and 128. For example, the nut 120 may include six leg members 122-128, only four of which are evident FIG. 1. Top portions of the legs 122-128 may join together in a hub 121, and bottom portions of the legs may radiate outward from the hub, as described in more detail below.

In a relaxed state of the nut 120, when no, or relatively low, forces are exerted on the legs 122-128 of the nut, the distance between outer sides of opposing legs (e.g., 122 and 128) can be greater than the opening width 162 and the interior width 160 of the shell 110. In a tensioned state of the nut 120, when opposing legs (e.g., 122 and 128) are pressed towards each other, the distance between outer sides of opposing legs can be less than or equal to the opening width 162 and the interior width 160 of the shell 110. Because the legs 122-128 extend outward as they extend downward from the hub 121, when the nut 120 is pressed upward into the open end 152 of the nut, the outward sloping sides 129 of the legs contact the flange 154 of the nut, and the vertical upward force on the nut is converted into a horizontal, inward force on the legs by the flange, causing the legs to be urged inward. A continued upward force on the nut 120 causes the nut to move upward into the shell 110 and the legs 122-128 to be urged further inward. Once the nut 120 is passed by the flange 154 of the shell 110, the legs 122-128 can spring outward away from each other due to the resiliency of their material. Thus, once the legs 122-128 of nut have passed the flange 154 they can extend outward, such that the distance between outer sides of the legs is equal to the inner width of the shell or at least is greater than the opening width 162 of the shell.

If the distance between outside surfaces of opposite legs (e.g., 122 and 128) in their relaxed state is greater than the interior width 160 of the shell, then when the nut 120 is inside the shell 110 the inability of one or more of the legs to return to their relaxed state may cause the one or more extending leg members to transfer some tension to the inside surface of the shell 110, thus making it difficult to rotate the nut 120 from within the shell 110. Therefore, when legs 122-128 of the nut 120 have been inserted into the shell 110, the legs may be either in their original relaxed state or in a tensioned state in which inner walls of the shell exert an inward force on the legs. Force by the inner walls of the shell 110 on the legs 122-128 can lock the nut inside the shell and inhibit movement of the nut 120 within the shell member 110 once the nut 120 has been placed within the shell 110. Furthermore, inner walls of the shell 110 can be dimpled, striated, or furrowed, such that the legs 122-128 catch on these surface imperfections and resist rotating with respect to the shell. The flange 154 retains/locks the nut in the shell, not the tension in the legs.

In an example embodiment, the base plate 130 may include a base plate foundation 132 and a base plate extension 134 that is adapted to receive the shell member 110. The location of the base plate extension 134 can serve to locate the shell 110 of within the resonant cavity. In one example embodiment, the base plate extension 134 may have a width 135 that is less than or equal to the opening width 162 of the shell member 110, such that the shell member 110 can fit over the base plate extension. In another example embodiment, the base plate extension 134 may have a width 135 greater than or equal to the outer width of the shell member 110, wherein the shell member 110 may fit into the base plate extension. In another example embodiment, the base plate extension 134 may be a countersunk portion of the base plate foundation 132, wherein the base plate extension is adapted to receive the shell member 110.

In an example embodiment, the base plate 130 may include a boring (described in more detail below with respect to FIG. 5) that extends through the base plate 130. A shaft 142 of a fastener 140 can be inserted at least partially through the boring of the base plate 130 and can engage with the nut 120. The shaft 142 may include an outer threaded portion 146 that can threadably engage with an inner threaded portion of the hub 121. Then, for a fastener 140 having a head 144 with a width greater than the width of the boring in the base plate 130 through which the shaft 142 extends, the head 144 will remain on a lower side of the base plate while the shaft 146 is threaded into the nut 120 and pulls the nut towards the base plate 130. Because the nut 120 is captured within the shell 110 the shell is pulled toward the base plate 130 with the nut 120 as the threaded portion 146 of the fastener 140 engages with the threaded portion of the nut 120 until the shell 110 fits tightly against the base plate 130 and/or the base plate extension 134 and makes good electrical contact with the base plate extension 134.

In another example embodiment, the base plate 130 may have a threaded boring that extends through only part of the base plate 130. For example, the threaded boring can be a tapped hole in the base plate 130. The fastener 140 may include a threaded portion at both ends of the shaft 142, and one end of the shaft can threadably engage with the threaded boring of the base plate, and the other end of the shaft can threadably engage with a threaded portion of the nut 120. In another example embodiment, the fastener 140 may be constructed integrally with the base plate 130.

By inserting the nut 120 into the open end 152 of the shell 110 and then engaging the nut with a fastener 140, a shell having a closed end 150 can be pulled into tight contact with the base plate 130. The closed end 150 of the shell, which can have a smooth surface and lack sharp corners, provides a shape in which electric fields are not highly concentrated and that reduces the possibility of electrical arcing from the shell to other components of the resonant cavity. Furthermore, the closed end 150, which has only large radii of curvature shapes, avoids the relatively sharp corners commonly associated with an resonator shape having an open end and therefore can function effectively at higher field strengths than a comparable resonator shape having an open end.

Figure 2:
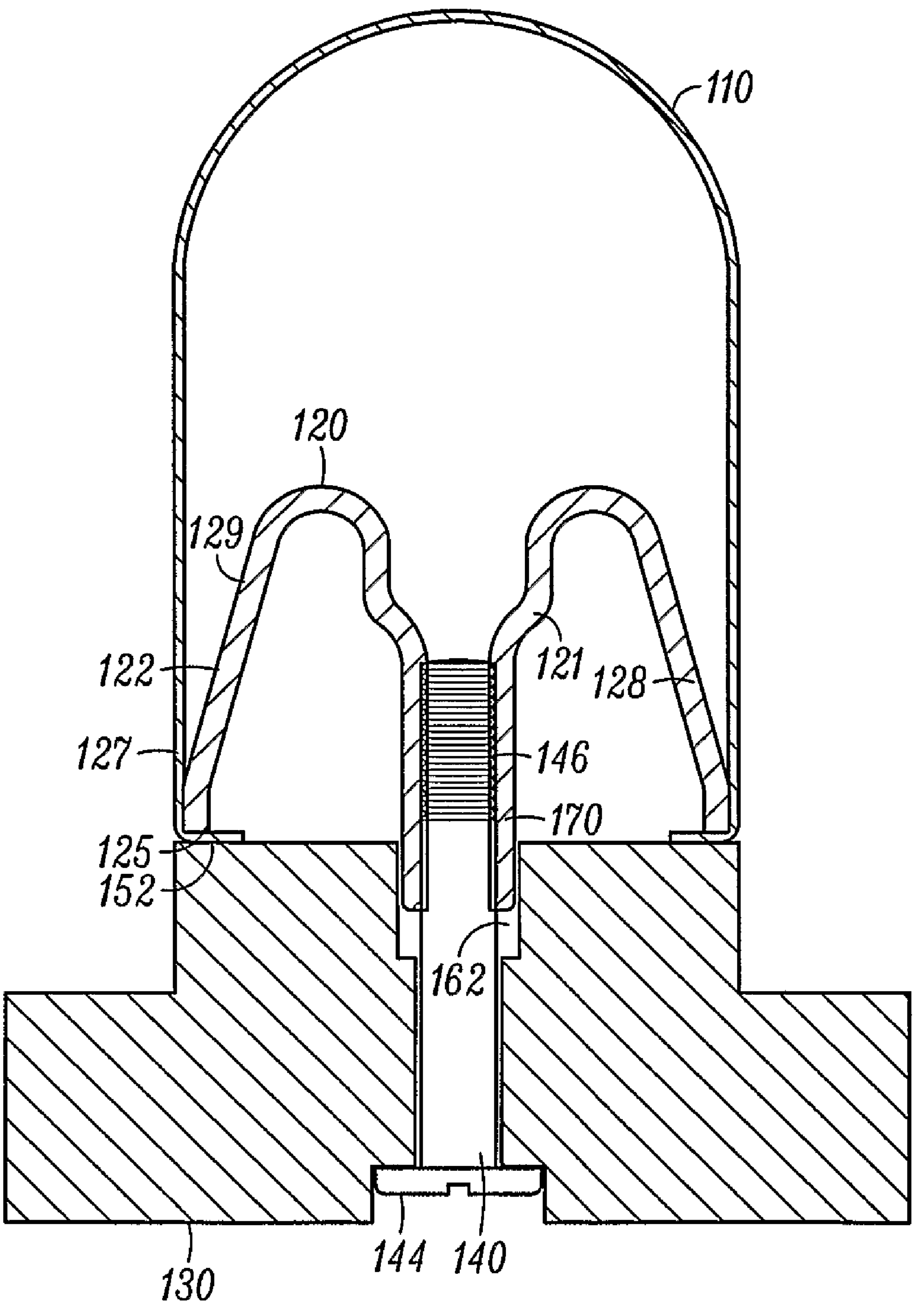
FIG. 2 is a cross-sectional view of a resonator shell attached to a base plate.

FIG. 2 is a schematic cross-sectional view of a resonator shell 110 attached to a base plate 130. The nut 120 fits at least partially inside the shell 110, such that bottom portions 125 of legs 122 and 128 contact the flange 152 of the shell 110. Vertical outer sides 127 of the nut, located near the bottom portions of the legs 122 and 128 can contact inner walls of the shell 110, such that the inner walls of the shell exert and inward force on the legs of the nut, thereby holding the legs in a tensioned state in which the distance between opposing legs is less than when the legs of the nut are in a relaxed state (e.g., when the nut is located outside the shell and no forces are exerted on the legs). A central lower portion 170 of the hub 121 can extend downward and be received by a boring 162 in the base plate 130. Thus, the lower portion 170 of the nut 120 positioned with the shell 110 can cooperate with the base plate 130 to locate the shell with respect to the base plate. In this manner, the position of the shell can be accurately ensured from one assembly to another.

The outer threaded portion 146 of the fastener can engage the inner threaded portion of the hub 121 of the nut, such that when the head 144 of the nut abuts a bottom surface of the base plate 130 and when the fastener is rotated with respect to the nut, the nut is drawn toward the base place. Because the bottom portions 125 of the legs of the nut contact the flange 152 of the shell 110, the shell is also drawn toward the base plate and into close contact with the base plate 130 when the fastener 140 is tightened into the nut 120.

Figure 3:
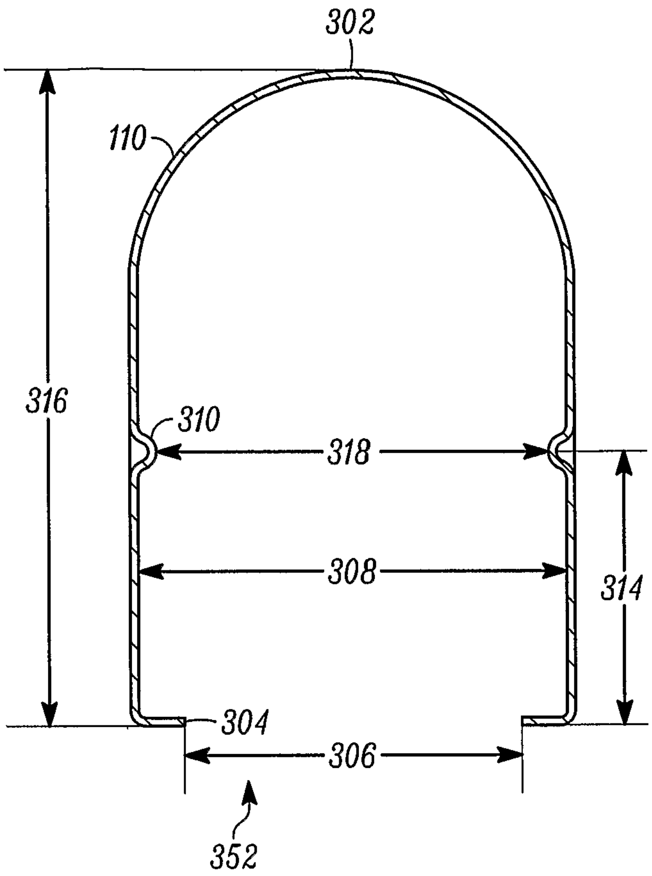
FIG. 3 is a schematic block diagram of a resonator shell

FIG. 3 is a schematic block diagram of a resonator shell 110. The shell member 110 may be one of a plurality of resonator shells to be attached to a base plate. The shell 110 may include a closed end 302 and an open end 352, and the open end may include an interior flange 304 that defines a flange opening 306. The shell 110 may have a height 316 between its closed end 302 and its open end 352. In one implementation embodiment, an interior width 308 of the shell 110 may be larger than the width of the flange opening 306. Furthermore, the width of the flange opening 306 may be large enough for the outer width of the nut 120, when the nut's extending leg members are in their tensioned state and not in their relaxed state, to pass at least partially through the flange opening 306.

The shell member 110 may also include an inward protrusion 310 in its inner wall that can engage with a corresponding inner depression in an outer wall of the nut 120 (e.g., in an outer surface of a leg of the nut), such that the protrusion 310 of the shell engages with the depression of the nut to secure the nut and the shell together. When the inward protrusion 310 is engaged with an inward depression in the nut, the nut may be locked in place within the shell 110, thus preventing, or rendering more difficult, the removal of the nut 120 from the shell member 110.

Alternatively, the inward protrusion may serve, rather than for engaging with depression in the nut, as a mechanical stop to prevent the nut 120 from entering into the shell 110 beyond a desired depth. For example, the protrusion may be located at a depth 314 from the bottom of the shell 110 and can define a width 318 of the shell at the depth 314 that is narrower than the width 308 of the shell at other depths. Thus, the protrusion can limit the entry of the nut 120 into the shell 110 beyond a desired depth (e.g., depth 314) by mechanically blocking the entry of the nut.

Figure 4A:
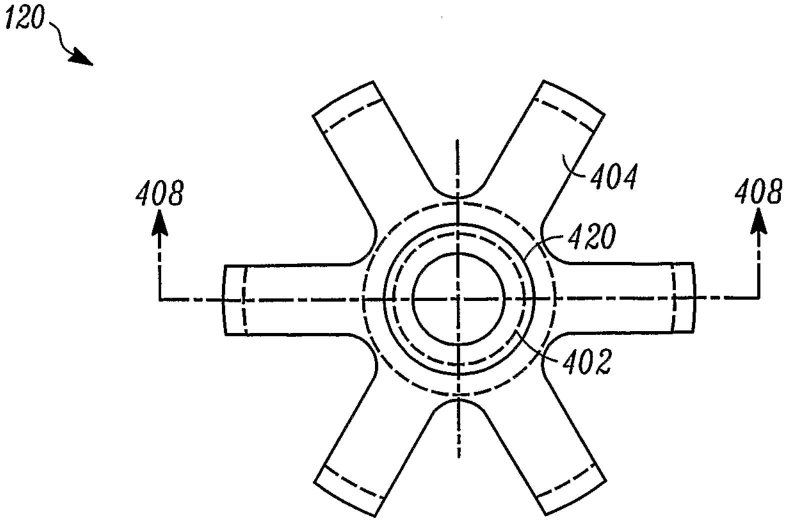
FIG. 4*a* is a schematic top view of a nut adapted for fastening a resonator shell to a base plate.

FIG. 4*a* is a schematic top view of the nut 120. The nut 120 may include a plurality of laterally extending legs 404, for example, six legs, that extend outward from a central hub 420, and the legs 404 may define an outer extent, or width, of the nut 120. The hub 420 may include a central hole 402 that has a width dimensioned and adapted for receiving the extending shaft 142 of the fastener 140. The central hole 402 can be, for example, at least partially threaded, such that the threaded portion is adapted to engage with threads of the extending shaft 142, so that the fastener 140 may tighten into the nut 120. Alternatively, the fastener may include a shaft 142 is inserted into the central hole 402 of the nut 120 and then is expanded to fit snuggly together with the nut and to draw the nut toward the base plate 130, like a rivet. In another implementation, the shaft 142 of the fastener 140 may be bonded to the nut 120 with an adhesive (e.g., an epoxy), such that the shaft may draw the nut 120 toward the base plate 130 after it has been bonded to the nut.

Figure 4B:
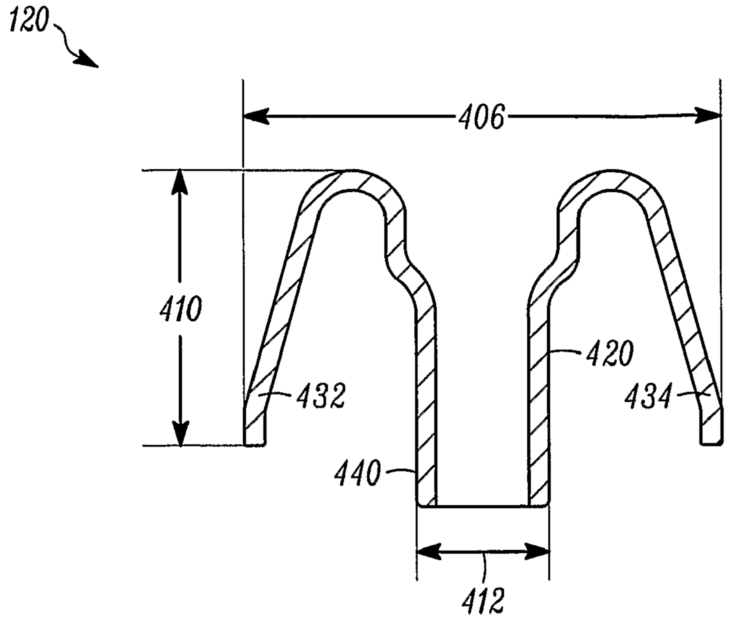
FIG. 4*b* is a schematic sectional view of the nut of FIG. 4*a* through the section 408.

FIG. 4*b* is a schematic cross-sectional view of the nut 120 shown through the section 408-408 of FIG. 4*a*. The nut 120 may have a height 410 that is substantially less than the height 316 of the shell 110. To prevent the nut from slipping too far into the shell 110, the protrusion 310 can limit the depth to which the nut 120 enters the interior of the shell 110 by contacting the top of the nut or the outside of one or more of the legs and blocking the nut from entering the shell beyond a desired depth. Because the legs 404 project at and angle to the vertical direction, the depth 314 may be less than the height of nut 410, and the protrusion 310 may contact the legs at a position between the top and the bottom of the nut.

The nut 120 may further include a base width 412, which may be, for example, equal to the outer width of the central hub 420. The base width 412 may be less than the width of the boring in the base plate 130, such that the hub 420 of the nut 110 may enter at least partially into the boring of the base plate 130. When the nut 120 is assembled within the shell 110 and shell/nut assembly is tightened into the base plate 130, the hub 420 may be long enough, such that a lower portion 170 of the hub 420 protrudes out of the interior or the shell 110 past the flange 154, so that it is received within the base plate boring.

The laterally extending legs 404 of the nut 120 are made of a resilient material (e.g., a metal, such as steel, aluminum, copper, Invar, Kovar) and therefore when opposing legs 432 and 434 of the nut are pressed towards by an inward force the legs will spring outward to their relaxed position when the force is removed. Thus, the laterally extending legs 404 may exist in a tensioned state in which the legs are compressed inward towards each other. In such a tensioned state, the lateral extent of the legs may define a tensioned outer width 406 of the nut 120 that is less than a relaxed outer width defined by the lateral extent of the legs in a relaxed state.

Figure 5:
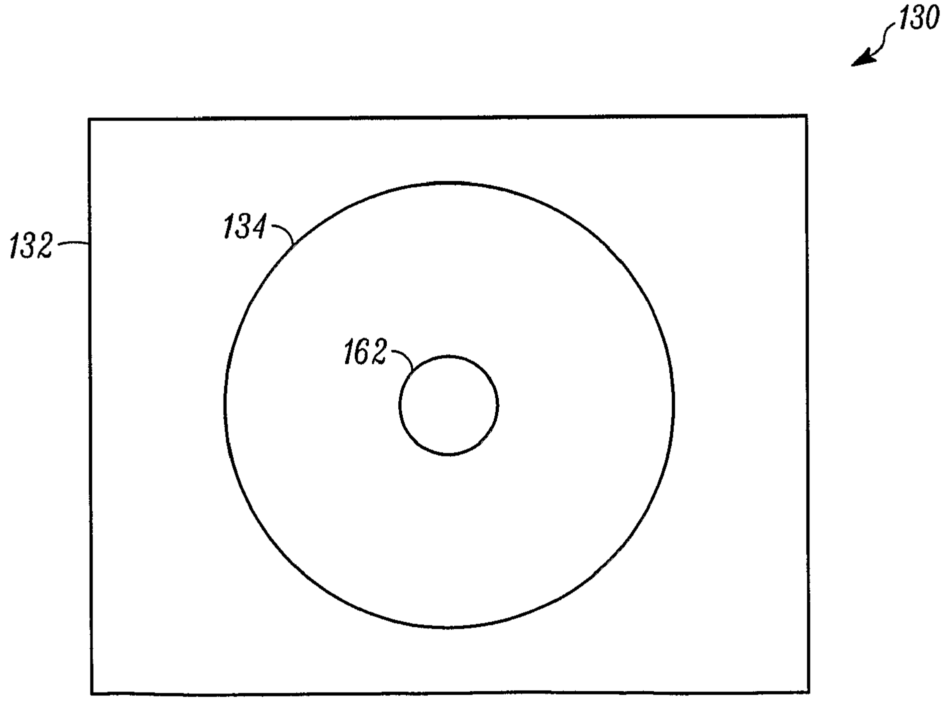
FIG. 5 is a schematic top view of a base plate adapted for receiving a resonator shell.

FIG. 5 is a schematic top view of a base plate 130 adapted for receiving a resonator shell 110. The base plate 130 can include a base plate foundation 132 and a base plate extension 134, where the base plate extension 134 is adapted to receive the shell 110. A boring 162 in the base plate extension 134 can receive a portion of the nut and can serve to locate the nut in the base plate and thereby locate the shell with respect to the base plate 130. In an example embodiment, the boring 162 may extend entirely or only partially through the base plate extension 134 and/or the base plate foundation 132, and the boring 162 may be adapted to allow the shaft 142 of the shaft fastener to pass through. Furthermore, the boring 162 may be dimensioned and adapted to receive at least part of the nut 120 (e.g., a lower portion 170 of the hub 420), and the base width 412 of the nut 120 may pass at least partially through the boring 162.

Figure 6:
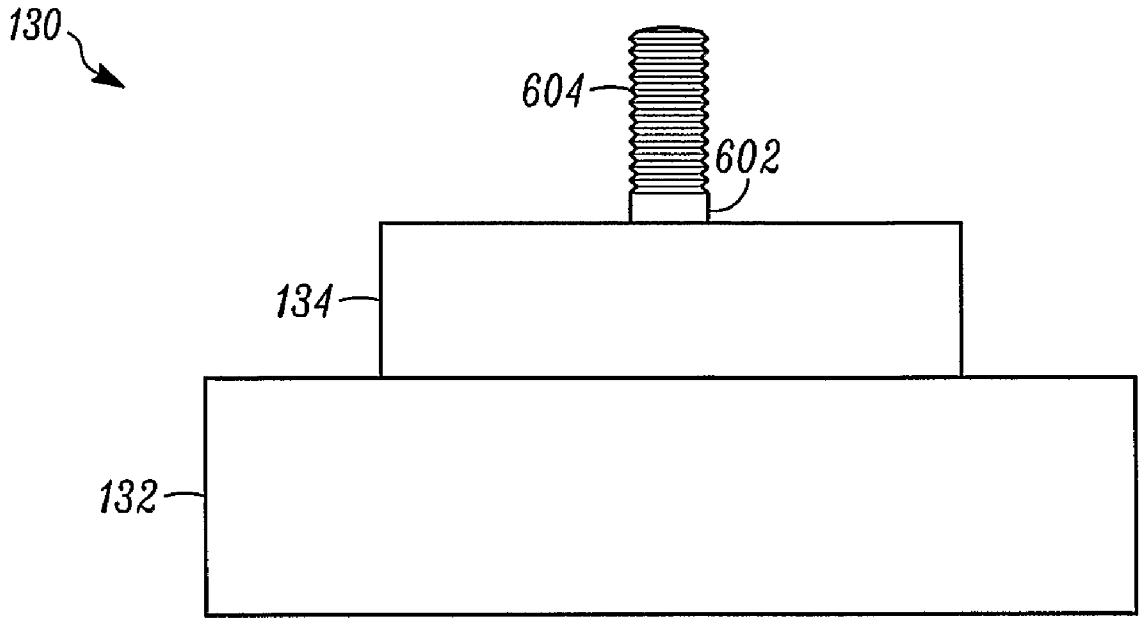
FIG. 6 is a schematic top view of a base plate adapted for receiving a resonator shell.

FIG. 6 is a schematic side view of a base plate 130 adapted for receiving a resonator shell 110. The base plate 130 may include both the base plate foundation 132 and a base plate extension 134, and the base plate extension may include a shaft 602 that is adapted to receive the shell member 110. The shaft 602 may be integrally formed with the base plate extension or may be attached separately to the base plate extension 134. The shaft 602 may include an outer threaded portion 604 that can be adapted to engage with an inner threaded portion of the hub 121 of the nut 120, such that the nut, when positioned within the shell can be threadably secured to the shaft 602.

After one or more resonator shells 110 are secured to the base plate 130 a top plate (not shown) can be secured to the base plate to define a resonant cavity that can be used as a bandpass filter.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention

What is claimed is:

1. An apparatus comprising:
- a shell member having an interior width, wherein the shell member includes a closed end and an open end, wherein the shell member comprises a resonator shell;
- a nut comprising a plurality of laterally extending resilient legs, wherein the legs define an outer width of the nut, wherein when the plurality of laterally extending resilient legs are in a relaxed state the outer width of the nut is greater than the interior width of the shell member, wherein the nut is adapted for at least partially entering the open end of the shell member such that the plurality of laterally extending resilient legs are placed in a tensioned state in which the plurality of laterally extending resilient legs define the outer width of the nut being smaller than or equal to the interior width of the shell member; and
- a base plate adapted for receiving the shell member and securing the shell member member to the base plate with the closed end of the shell facing away from the base plate through cooperation with the nut when the nut is at least partially within the shell member.

2. The apparatus of claim 1, wherein the base plate further comprises:
- a countersunk portion that is adapted to receive the shell member.

3. The apparatus of claim 1, wherein the base plate further comprises:
- a shaft adapted for securing the shell member to the base plate through cooperation with the nut, wherein the shaft is adapted to pass at least partially through the nut.

4. The apparatus of claim 1, wherein the base plate includes a boring, the apparatus further comprising:
- a shaft adapted for securing the shell member to the base plate through cooperation with the nut, wherein the shaft is adapted to pass at least partially through the boring in the base plate and at least partially through the nut.

5. The apparatus of claim 4, wherein the shaft further comprises:
- a head having a width greater than a width of a central portion of the shaft, wherein a width of the head is greater than the width of the boring of the base plate.

6. The apparatus of claim 4, wherein the shaft further comprises:
- an outer threaded portion that is adapted for engaging with an inner threaded portion of the boring.

7. The apparatus of claim 4, wherein the shaft further comprises:
- a bolt adapted to be threaded through threads of the nut.

8. The apparatus of claim 4, wherein the outer width of the nut when positioned within the shell member is greater than a width of the boring.

9. The apparatus of claim 1, wherein the shell member further comprises:
- an interior flange defining a flange opening having a width that is less than the interior width of the shell member, wherein the nut is adapted to be passed at least partially through the open end and the flange opening, such that the shell member of the nut pass at least partially past the interior flange and then extend to define the outer width of the nut being greater than the flange opening width.

10. The apparatus of claim 9, wherein the base plate includes a boring, the apparatus further comprising:
- a shaft adapted for securing the shell member to the base plate, wherein the shaft includes a head having a width greater than a width of a central portion of the shaft, wherein the shaft is adapted to pass at least partially through the boring, and at least partially through the nut, and wherein the width of the head is greater than a width of the boring of the base plate.

11. The apparatus of claim 10, wherein the shaft further comprises:
- a bolt adapted to be threaded through threads of the nut.

12. The apparatus of claim 1, wherein the shell member further comprises:
- at least one inner wall, wherein at least a portion of at least one of the shell member of the nut contacts the at least one inner wall.

13. The apparatus of claim 1, wherein the resonator shell of the shell member is:
- a deep drawn resonator shell.

14. The apparatus of claim 1, wherein the nut further comprises:
- an at least partially threaded inner hub.

15. The apparatus of claim 1, wherein the plurality of laterally extending resilient legs of the nut further comprise:
- at least three laterally extending resilient legs.

16. The apparatus of claim 1, wherein the shell member further comprises:
- an inward protrusion, wherein an inner width of the shell member at the inward protrusion is less than the interior width of the shell member, and wherein the inner width of the shell member at the inward protrusion is adapted to inhibit the entry of the nut into the shell member.

17. A method of securing a resonator shell including an open end and a closed end to a base plate, the method comprising:

inserting, into the open end of the resonator shell, a nut including extending legs that, in a relaxed position, define a relaxed outer width of the nut that is greater than an interior width of the resonator shell;

allowing the extending legs to extend within an interior of the resonator shell to define a tensioned outer width of the nut that is greater than an opening width of the open end of the resonator shell;

securing a fastener to the nut; and drawing the resonator shell securely against the base plate with the fastener secured to the nut.

18. The method of claim 17, wherein the resonator shell is a deep drawn resonator shell.

19. The method of claim 17, further comprising:

threading the fastener into threads of the nut.

20. An apparatus comprising:

a shell member having an interior width, wherein the shell member includes a closed end and an open end;

a nut comprising a plurality of laterally extending resilient legs, wherein the plurality of laterally extending resilient legs define an outer width of the nut, wherein when the plurality of laterally extending resilient legs are in a relaxed state the outer width of the nut is greater than the interior width of the shell member, wherein the nut is adapted for at least partially entering the open end of the shell member such that the plurality of laterally extending resilient legs are placed in a tensioned state in which the plurality of laterally extending resilient legs define the outer width of the nut being smaller than or equal to the interior width of the shell member;

a base plate adapted for receiving the shell member and securing the shell member member to the base plate with the closed end of the shell facing away from the base plate through cooperation with the nut when the nut is at least partially within the shell member; and a shaft adapted for securing the shell member to the base plate through cooperation with the nut, wherein the shaft is adapted to pass at least partially through a boring in the base plate and at least partially through the nut.

* * * * *